US011364808B2

(12) United States Patent
Albl et al.

(10) Patent No.: US 11,364,808 B2
(45) Date of Patent: Jun. 21, 2022

(54) CONTACTLESS CHARGING DEVICE FOR A MOTOR VEHICLE AND MOTOR VEHICLE

(71) Applicant: AUDI AG, Ingolstadt (DE)

(72) Inventors: Sebastian Albl, Gaimersheim (DE); Sandro Weigelt, Lenting (DE); Stefan Bickelmaier, Ingolstadt (DE)

(73) Assignee: AUDI AG, Ingolstadt (DE)

(*) Notice: Subject to any disclaimer, the term of this patent is extended or adjusted under 35 U.S.C. 154(b) by 380 days.

(21) Appl. No.: 16/693,731

(22) Filed: Nov. 25, 2019

(65) Prior Publication Data

US 2020/0198480 A1    Jun. 25, 2020

(30) Foreign Application Priority Data

Dec. 20, 2018    (DE) .................... 10 2018 222 457.9

(51) Int. Cl.
*B60L 53/00* (2019.01)
*B60L 53/12* (2019.01)
*B60L 50/60* (2019.01)
*H02J 50/10* (2016.01)
*H02J 7/02* (2016.01)
*B60K 1/04* (2019.01)

(52) U.S. Cl.
CPC ............... *B60L 53/12* (2019.02); *B60K 1/04* (2013.01); *B60L 50/66* (2019.02); *H02J 7/02* (2013.01); *H02J 50/10* (2016.02)

(58) Field of Classification Search
CPC ........ B60L 53/124; B60L 53/12; B62D 21/11; B62D 21/155
USPC ........................................................ 180/291
See application file for complete search history.

(56) References Cited

U.S. PATENT DOCUMENTS

| | | | | |
|---|---|---|---|---|
| 6,478,106 | B2* | 11/2002 | Hawener | B62D 21/11 180/382 |
| 9,776,661 | B2* | 10/2017 | Kaneko | B62D 21/155 |
| 9,914,480 | B2* | 3/2018 | Taguchi | B62D 21/11 |
| 10,029,551 | B2* | 7/2018 | Ito | B60L 58/26 |

(Continued)

FOREIGN PATENT DOCUMENTS

| | | |
|---|---|---|
| DE | 100 31 165 A1 | 1/2002 |
| DE | 10 2013 226 830 A1 | 6/2015 |

(Continued)

OTHER PUBLICATIONS

German Office Action dated Jan. 29, 2020, in connection with corresponding DE Application No. 10 2018 222 457.9 (16 pgs., including machine-generated English translation).

*Primary Examiner* — Hau V Phan
(74) *Attorney, Agent, or Firm* — Maier & Maier, PLLC

(57) ABSTRACT

A contactless charging device for arrangement on an underside of a motor vehicle. The charging device has a first side facing away from the motor vehicle in a state in which the charging device is arranged on the underside of the motor vehicle. The charging device has a second side opposite the first side, facing towards the motor vehicle in a state in which the charging device is arranged on the underside of the motor vehicle. The second side is then configured to be ramp-shaped so that a thickness of the charging device increases in a first direction, pointing towards a rear of the motor vehicle in a state in which the charging device is arranged on the underside of the motor vehicle, over a part of a length of the charging device in the first direction.

10 Claims, 2 Drawing Sheets

(56) References Cited

U.S. PATENT DOCUMENTS

2012/0319644 A1* 12/2012 Hu .................. H02J 50/90
                                                    320/108
2016/0297306 A1* 10/2016 Herzog ............ B60L 53/124
2018/0148109 A1*  5/2018 Ayukawa ........... B62D 21/11
2018/0152057 A1*  5/2018 Misawa ............ B60L 53/124

FOREIGN PATENT DOCUMENTS

DE    10 2015 208 834 A1   12/2016
DE    10 2016 014 964 A1    7/2017

* cited by examiner

CONTACTLESS CHARGING DEVICE FOR A MOTOR VEHICLE AND MOTOR VEHICLE

FIELD

The invention relates to a contactless charging device for arrangement on an underside of a motor vehicle, wherein the charging device is configured such that energy is contactlessly transferable to the charging device. The charging device then also has a first side facing away from the motor vehicle in a state in which the charging device is arranged on the underside of the motor vehicle, and a second side opposite the first side, facing towards the motor vehicle in a state in which the charging device is arranged on the underside of the motor vehicle. The invention also includes a motor vehicle having such a contactless charging device.

BACKGROUND

Contactless charging devices, such as inductive charging devices, are known from the prior art. The onboard charging device is usually referred to as a secondary charging device, and an infrastructure-side charging device is usually referred to as a primary charging device. By inductively coupling the primary charging device and the secondary charging device, energy can be transferred from the primary charging device to the secondary charging device, by means of which a motor vehicle battery can be charged.

In the event of an accident, it is important to protect relevant components of a motor vehicle as well as possible. As an example, DE 10 2016 014 964 A1 describes a vehicle having an inductive charging plate in the area of the vehicle bottom, secured to the vehicle bottom by means of a number of flexible retaining elements. Thus, by means of the retaining elements, the charging plate is resiliently mounted and can yield when driving from a curb, which is supposed to at least substantially exclude the risk of damage to the charging plate.

Furthermore, U.S. Pat. No. 6,478,106 B2 describes a transmission housing with a crash case arranged at an underside, the crash case having a suitable surface. This is to enable the transmission unit, in the event of an impact, to move against the direction of travel without damage and obstruction, if possible.

However, even more important than the protection of a charging plate or a transmission is the protection of a high-voltage battery of a motor vehicle as it poses a particularly high risk when damaged, in particular to occupants of the motor vehicle, such as because of a fire. Typically, in order to protect the battery, sophisticated bracing elements, deformable elements or the like are used and installed to protect the high-voltage battery as well as possible during an impact. However, this requires a lot of installation space and greatly increases the weight of the motor vehicle.

SUMMARY

The object of the present invention is to propose a possibility of how to provide protection for a high-voltage battery of a motor vehicle in a manner which is as simple, cost-effective, efficient in terms of installation space and weight-saving as possible.

In a contactless charging device according to the invention for arrangement on an underside of a motor vehicle, the charging device is configured such that energy is contactlessly transferable to the charging device, wherein the charging device has a first side facing away from the motor vehicle in a state in which the charging device is arranged on the underside of the motor vehicle, and a second side opposite the first side, facing towards the motor vehicle in a state in which the charging device is arranged on the underside of the motor vehicle. In addition, the second side is configured to be ramp-shaped so that a thickness of the charging device increases in a first direction, pointing towards the rear of the vehicle in a state in which the charging device is arranged on the underside of the motor vehicle, over a part of a length of the charging device in the first direction.

In this respect, the invention is based on the following findings: first, it is advantageous, in terms of installation space, to position the drive unit of the motor vehicle as flatly or deeply within the front end as possible to generate as much installation space there as possible, which may be used for maximizing a front trunk, for example. This results in the drive unit then being arranged in front of the high-voltage battery in the direction of travel, the latter in turn being preferably arranged in the underfloor of the motor vehicle. However, to then prevent, in the event of a frontal impact, such as an accident, the drive unit from being pushed or striking backwards against the high-voltage battery, very sophisticated measures have had to be taken so far, for example, the provision of additional bracing elements for intercepting the drive unit, also adding a lot of weight. Furthermore, the invention is based on the finding that a contactless charging device, which has not been used actively for crash design so far, can at least partially be arranged between the drive unit and the high-voltage battery to actively use it for crash kinematics. Now, this is advantageously accomplished by the invention by the second side of the charging device being configured to be ramp-shaped. Advantageously, this ramp shape enables the charging device to deflect a drive unit of the motor vehicle moving in the direction of the high-voltage battery such that the drive unit does not impact the high-voltage battery. Hence, the charging device fulfills a dual function of contactlessly receiving energy from a primary charging device and charging the high-voltage battery of the motor vehicle with the energy received, on the one hand, and that of a protective function for the high-voltage battery, on the other hand. Advantageously, additional components for protecting the high-voltage battery, especially with respect to a possible frontal impact, can thus be eliminated, therefore allowing to save both installation space and weight and additionally also costs.

Moreover, the thickness preferably increases over at least 25 percent of the total length of the charging device. For example, the thickness may increase over a partial length of between a fourth and half of the total length. This offers the great advantage that this ramp effect can be provided over a large part of the length of the charging device. The longer the distance which can be used for deflecting a drive unit impacting the second side, the smaller the stresses which the charging device has to withstand, and accordingly, the more efficient it becomes to cause a diversion of the drive unit. The risk of damaging the charging device or even the high-voltage battery can be further reduced thereby. Accordingly, it is preferred that the thickness does not only increase over most of half the length of the charging device, but preferably even over most of the total length of the charging device in the first direction.

Accordingly, it is a further particularly advantageous design of the invention if the second side is formed such that a force acting on the second side of the charging device in the first direction is at least partially, in particular for the most part, divertible into a second direction perpendicular to the first one, wherein the second direction represents a direction from the first side of the charging device to the second side of the charging device. In the intended installation position of the charging device, a force diversion of a force acting against the direction of travel on the second side occurs in an upward direction, that is in the direction of the motor vehicle and not in the direction of the ground on which the motor vehicle currently resides. This offers the great advantage, for example, that a drive unit can be intercepted considerably easier by other components of the motor vehicle, such as by a part of the body frame of the motor vehicle. Hence, in a frontal crash, the drive unit can be moved upwards by the charging device kinematically and supported by the body frame. Hence, advantageously, the drive does not impinge on the high-voltage battery without sophisticated measures being required.

According to a further advantageous design of the invention, it is preferred that the thickness of the charging device at least doubles, preferably even triples, over the course in the first direction from its minimum to its maximum. As an example, the minimum of the thickness can then be one centimeter. Due to this sizing and, above all, due to this significant increase in thickness, a particularly efficient diversion of the drive unit can occur so that it can be ensured that it does not strike the high-voltage battery even without sophisticated measures.

In general, the contactless charging device can be configured as a capacitive charging device, however, preferably, it is configured as an inductive charging device, thus being configured to draw energy from a primary charging device through inductive coupling with the primary charging device. Furthermore, the charging device is designed such that it is de-energized prior to an accident-related impingement, in particular de-energized in a state in which it is arranged on the motor vehicle already prior to the motor vehicle driving. As an example, this can be accomplished by switching off the charging device or decoupling it from the remaining onboard motor vehicle network or at least from the high-voltage battery immediately after a charging operation performed upon standstill of the motor vehicle prior to the motor vehicle driving. Furthermore, the contactless charging device can be configured as a charging plate, for example. The upper side of this charging plate, that is the second side, is configured with the described ramp function.

In order to provide this ramp function, there are in turn several configuration options for this second side of the charging device.

In general, it is preferred, that the thickness then increases continuously over the part of the length of the charging device in the first direction. Thus, the thickness should not be able to decrease again in sections in the first direction as this would diminish the efficiency of the force diversion or at least not contribute to it in an advantageous manner.

As an example, according to an albeit less preferred design, it can be contemplated that the thickness increases linearly over the part of the length of the charging device in the first direction. Thus, the second side of the charging device can be configured to be wedge-shaped in its cross section, for example. Thus, due to the linear increase in thickness, the second side is accordingly partially provided by a plane having a constant slope. This enables a particularly simple configuration of the charging device.

However, the thickness may also increase non-linearly over the part of the length of the charging device in the first direction, which is preferred. Hence, according to a further advantageous design of the invention, the second side is at least partially curved concavely. Thus, as an example, the slope of the second side can increase against the direction of travel. With such a shape of the second side, a continuous and less abrupt force diversion can be provided which is considerably more gentle and thus, in turn, reduces the risk of damaging the charging device and/or the high-voltage battery. It is then particularly preferred if the second side can be divided into at least two, preferably three, subsections in the first direction. In the first subsection, the thickness is at its minimum value and constant over the first subsection in the first direction. In the second subsection, following the first subsection in the first direction, the thickness increases up to is maximum value, in particular continuously and in a ramp shape and also advantageously with a slope increasing in the first direction. In the optional further third subsection, which may, however, also be omitted and which follows the second subsection in the first direction, the thickness maintains its maximum value, thus being constant again. The first side of the charging device and the second side in the first subsection and in the optional third subsection are then configured to be substantially flat, and the second side extends parallel to the first side in the first and third subsections.

Moreover, the invention also relates to a motor vehicle having a contactless charging device according to the invention or one of its designs. Hence, the advantages described for the contactless charging device according to the invention and its designs apply to the motor vehicle according to the invention in the same manner.

In a further advantageous design of the motor vehicle according to the invention, the charging device is arranged on the underside of the motor vehicle such that the first side of the charging device faces towards a ground underneath the motor vehicle, and the first direction extends from the vehicle front to the rear of the motor vehicle. In other words, the charging device is installed in the motor vehicle as already described above.

Now it is particularly advantageous, as also already described, if the motor vehicle has a drive unit, in particular an electric drive, and a high-voltage battery, wherein the charging device is arranged at least partially between the drive unit and the high-voltage battery, wherein the drive unit is arranged between the vehicle front and at least one part of the charging device, and the high-voltage battery is arranged between the charging device and the rear of the motor vehicle. Accordingly, the charging device can advantageously provide a protective function for the high-voltage battery in the event of a frontal impact by deflecting an electric drive upwards moving in the direction of the high-voltage battery and thus protecting the high-voltage battery from an impact of the electric drive even without sophisticated measures which would require additional weight.

Accordingly, it is a further particularly advantageous design of the motor vehicle if the motor vehicle is configured such that, upon the drive unit moving in the first direction due to an accident and the drive unit striking the charging device, the movement of the drive unit is partially redirected into the second direction, and the drive unit strikes a part of a body frame of the motor vehicle, and in particular not the charging device. In other words, the drive unit is diverted to a part of the body frame of the motor vehicle and can be intercepted thereby in a particularly efficient manner. In turn, a collision of the drive unit with the high-voltage battery can be avoided efficiently, even without any sophisticated measures.

In a further advantageous design of the invention, the charging device and/or the high-voltage battery are secured such that the charging device and/or the high-voltage battery partially move against the second direction during the spatial deflection of the drive unit moving in the first direction.

In other words, if the drive unit impacts the charging device due to an accident, the charging device is partially moved against the second direction, that is downwards, while the drive unit is moved upwards at the same time due to the ramp-shaped surface of the second side. Then it is preferred that not only the charging device, but also the high-voltage battery are somewhat moved together with the charging device against the second direction. As an example, the charging device and the high-voltage battery can be secured such that they somewhat swivel or tilt about a common pivot point while the drive unit is diverted in its course of movement. Advantageously, this downward movement can intercept a part of the impact energy.

Preferably, the motor vehicle according to the invention is designed as a motorized vehicle, in particular as a passenger car or truck, or as a passenger bus or motorcycle.

The invention also comprises combinations of features of the embodiments described.

BRIEF DESCRIPTION OF THE DRAWINGS

Exemplary embodiments of the invention are described in the following. In the drawings.

DETAILED DESCRIPTION

Figure 1:
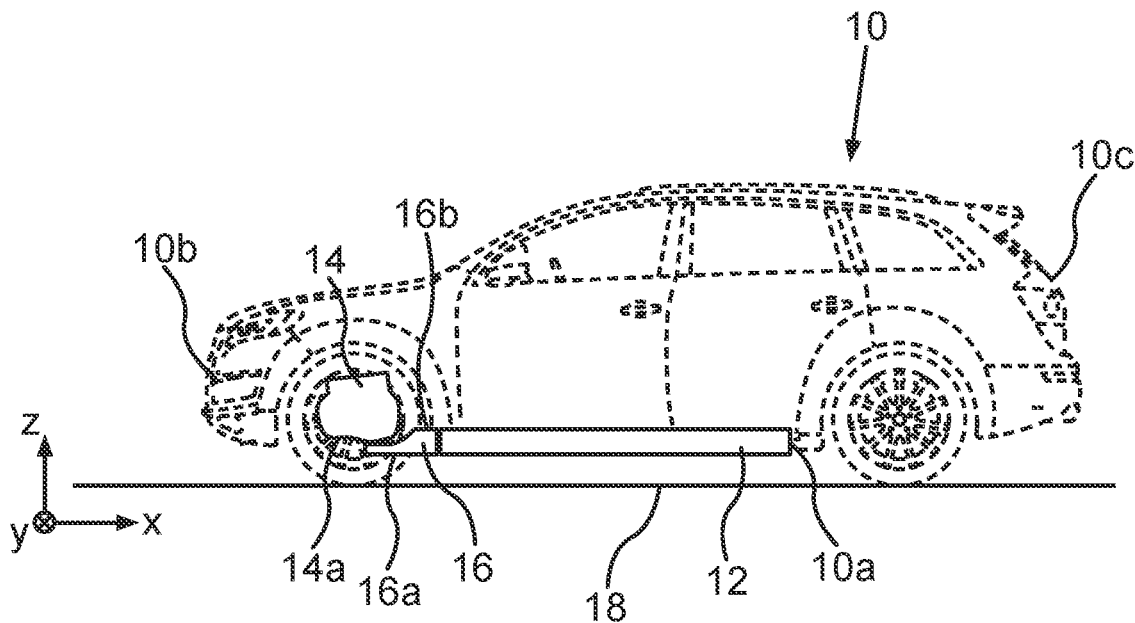
FIG. 1 shows a schematic diagram of a motor vehicle, having a high-voltage battery, a drive unit, and a charging device according to an exemplary embodiment of the invention.

The exemplary embodiments explained hereinafter are preferred embodiments of the invention. In the exemplary embodiments, the described components of the embodiments each represent individual features of the invention to be considered independently of each other, each also further developing the invention independently of each other. Therefore, the disclosure is to also comprise others than the combinations of features of the embodiments shown. Furthermore, the embodiments described may also be supplemented by further features of the invention already described.

In the figures, like reference numerals each denote functionally identical elements.

FIG. 1 shows a schematic diagram of a motor vehicle 10, having a high-voltage battery 12, a drive unit, such as an electric drive 14, and an inductive charging device 16 according to an exemplary embodiment of the invention. Charging device 16 is then arranged on an underside 10a of the motor vehicle and has a first side 16a facing towards a ground 18 on which motor vehicle 10 resides, and a second side 16b opposite first side 16a. High-voltage battery 12 is also arranged on an underside of motor vehicle 10, that is in the area of an underbody of motor vehicle 10, in particular between the wheel axles of motor vehicle 10. Furthermore, charging device 16 is partially arranged between the drive unit, that is electric drive 14, and high-voltage battery 12.

The underside of electric drive 14, here denoted with 14a, can also be located above the part of second side 16b of charging device 16 facing towards vehicle front 10b, but not completely above charging device 16.

Second side 16b of charging device 16 is now advantageously configured or formed to be ramp-shaped. Thereby, a thickness of charging device 16 varies in the direction of length L (cf. FIG. 3), wherein length L of charging device 16 extends in the x-direction of the coordinate system shown, and the thickness of charging device 16 varies accordingly in the direction of the z-axis parallel to the vertical vehicle axis. The thickness then increases in a first direction, also corresponding to the x-direction of the coordinate system shown.

Figure 2:
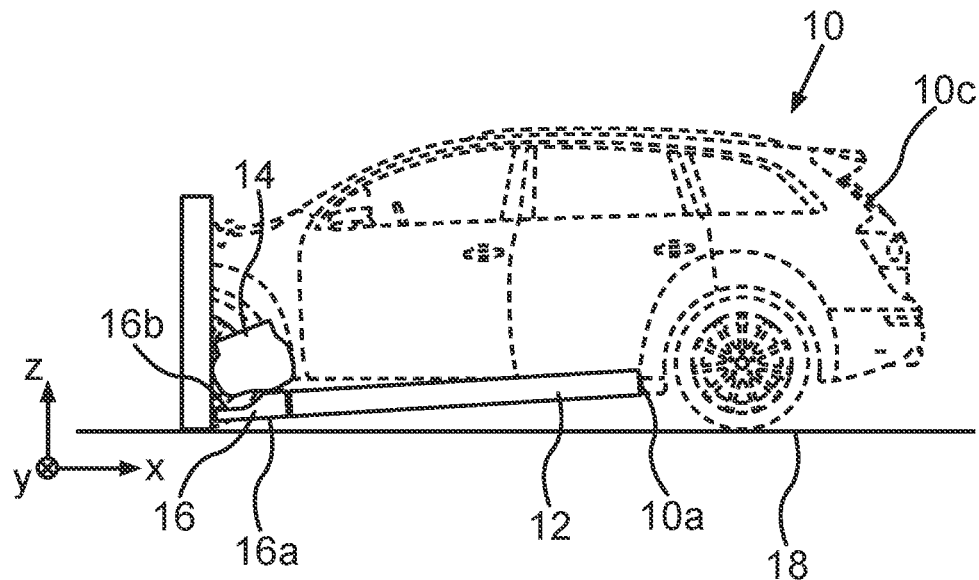
FIG. 2 shows a schematic diagram of the motor vehicle of FIG. 1 during a frontal impact according to an exemplary embodiment of the invention.

Due to this advantageous shape of second side 16b of charging device 16, charging device 16 can now be actively used for crash kinematics. Then, charging device 16 is de-energized prior to an accident-related impingement at the latest and preferably already prior to motor vehicle 10 driving. If a frontal impact occurs, as shown in FIG. 2, then electric drive 14 can be moved upwards, that is in the z-direction, kinematically by the inductive charging plate or charging device 16, and be supported by body frame 20, for example (cf. FIG. 3). Hence, in the event of a frontal crash, high-voltage battery 12 is advantageously not impinged by drive 14 even without any sophisticated measures which would require additional weight.

Furthermore, charging device 16 and high-voltage battery 12 can be secured to motor vehicle 10 or in the area of underbody 10a such that charging device 16 at least somewhat moves, in particular swivels or tilts, against the z-direction shown, that is downwards in the direction of ground 18, together with high-voltage battery 12 during a frontal impact, as shown in FIG. 2. The force acting on charging device 16 when diverting electric drive 14 in the event of a frontal crash causes this downward deflection of charging device 16 and high-voltage battery 12. As an example, charging device 16 and high-voltage battery 12 can also be arranged on a common support element, which can be located between charging device 16 and high-voltage battery 12, for example.

FIG. 3 again shows a schematic diagram of the arrangement of high-voltage battery 12, electric drive 14 and charging device 16 according to an exemplary embodiment of the invention in detail. As can also be seen here, an underside 14a of electric drive 14 is located above only one part of second side 16b of charging device 16. Furthermore, this example also illustrates the variation in the thickness of charging device 16. Sections of charging device 16 which are closer to vehicle front 10b have a smaller thickness than sections of the charging plate or charging device 16 in general, which is closer to rear 10c (cf. FIG. 1). Thus, the thickness varies in the first direction, that is the x-direction, over the length L of charging device 16.

Three different thicknesses $d_1$, $d_2$, $d_3$ are illustrated herein by way of example. The first thickness $d_1$ is then smaller than the second thickness $d_2$ and the latter is in turn smaller than the third thickness $d_3$. Then, the thickness of the charging device can at least double, preferably even at least triple, in the course in the first direction x from its minimum, which represents the first thickness $d_1$ in this case, up to its maximum, which represents the third thickness $d_3$ in this case. Due to this sizing and, above all, due to this significant increase in thickness, a particularly efficient diversion of the drive unit can be accomplished.

Figure 3:
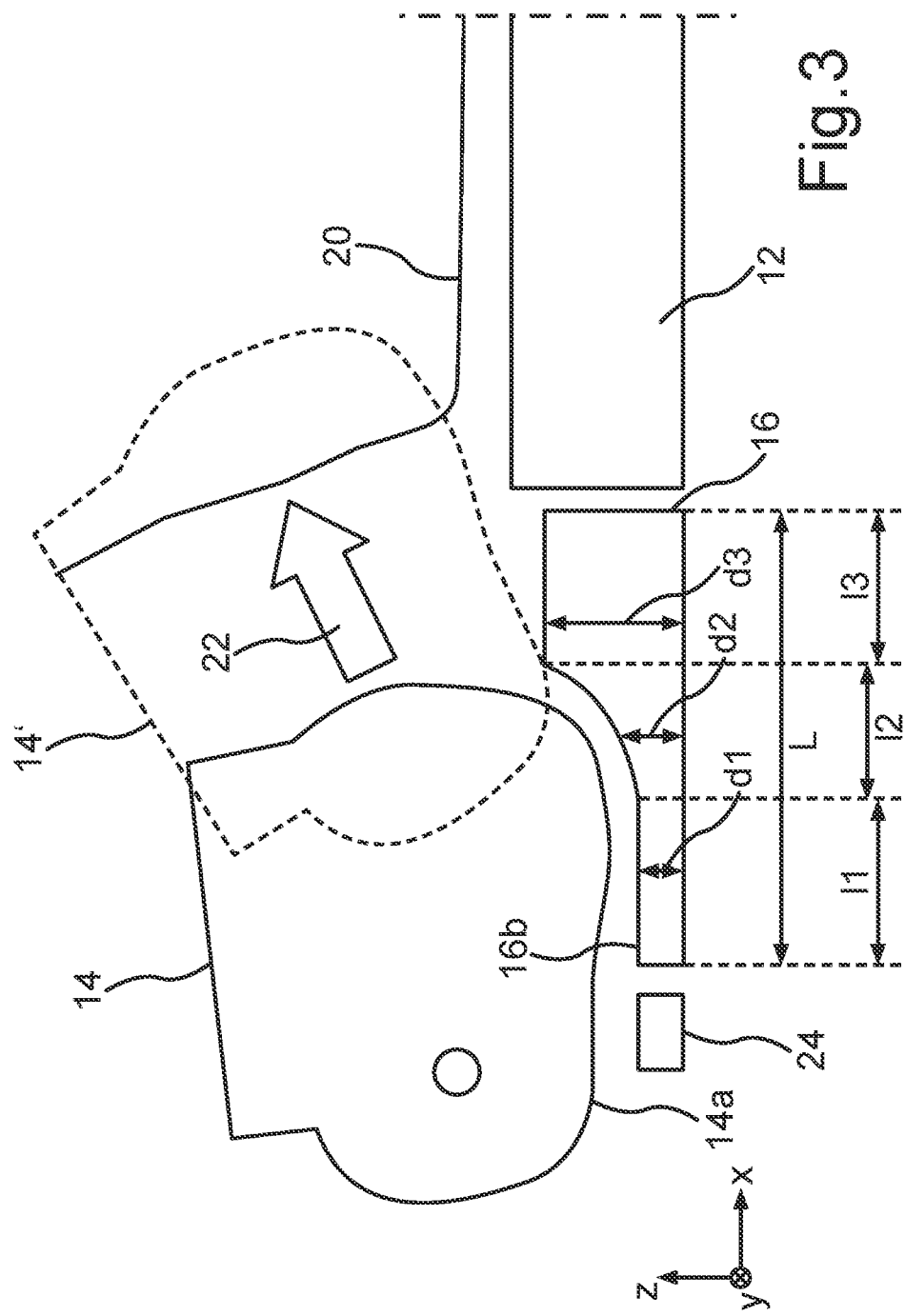
FIG. 3 shows a schematic diagram of the arrangement out of drive unit, high-voltage battery and charging device and of the diversion of the kinetic energy of the drive unit during a frontal impact by the charging device according to an exemplary embodiment of the invention.

It is also particularly preferred if second side 16b can be divided into at least two, preferably three, subsections, with respective partial lengths 11, 12, 13, as also shown in FIG. 3, in first direction x. In the first subsection of first partial length 11, the thickness is at its minimum value d1 and constant over first partial length 11 in the first direction. In the second subsection of second partial length 12, following the first subsection in first direction x, the thickness increases up to is maximum value d3, in particular continuously and in a ramp shape and also advantageously with a slope increasing in first direction x. In the optional further third subsection of third partial length 13, which may, however, also be omitted and which follows the second subsection in first direction x, the thickness maintains its maximum value d3, thus being constant.

This ramp-shaped profile of second side 16*b*, in particular second partial length 12, can then extend over a part of length L of charging device 16, preferably over at least a fourth of length L, as shown herein. In general, the two other partial lengths 11, 13 can be sized freely, and first partial length 11 can also be at least one fourth of length L and third partial length 13 can also be one fourth of length L or may be omitted completely. In addition, second side 16*b* of charging device 16 can be configured to be translationally invariant with respect to its shape in the direction of its width, i.e., in the y-direction. Also, the thickness can increase linearly, or preferably, as in this example, non-linearly, so that the slope of second side 16*b*, or its surface in the x-direction, increases at least in second subsection 12. As can also be clearly seen in FIG. 3, this shape of second side 16*b* of charging device 16 enables the kinematics of electric drive 14 to be advantageously diverted upon a frontal impact, and supported by a part of body frame 20, for example. In FIG. 3, the movement of the electric drive is illustrated by arrow 22. Furthermore, electric drive 14 is denoted with 14' and shown as a dashed line in its position during or after the frontal impact. Furthermore, 24 denotes a cross member of a subframe of motor vehicle 10.

As a whole, the examples show how the invention can provide an inductive charging plate with a structural crash function, which, due to a ramp-shaped configuration of its upper side, enables a particularly efficient, cost-effective and weight-saving deflection of a movement of an electric drive of the motor vehicle so that the high-voltage battery thereof is not impinged even without sophisticated measures and can thus be protected by the inductive charging plate.

The invention claimed is:

1. A contactless charging device for arrangement on an underside of a motor vehicle, wherein the contactless charging device is configured such that energy is contactlessly transferable to the contactless charging device, the contactless charging device comprising:
   a first side facing away from the motor vehicle, and
   a second side opposite the first side, facing towards the motor vehicle, wherein the second side is configured to be ramp-shaped so that a thickness of the contactless charging device increases in a first direction, pointing towards a rear of the motor vehicle over a length of the contactless charging device in the first direction.

2. The contactless charging device as claimed in claim 1, wherein the second side is formed such that a force acting on the second side of the contactless charging device in the first direction is at least partially, divertible into a second direction perpendicular to the first one, wherein the second direction represents a direction from the first side of the contactless charging device to the second side of the contactless charging device.

3. The contactless charging device as claimed in claim 1, wherein the thickness at least doubles in the first direction from a minimum up to a maximum.

4. The contactless charging device as claimed in claim 1, wherein the thickness continuously increases over the part of the length of the contactless charging device in the first direction.

5. The contactless charging device as claimed in claim 1, wherein the second side is at least partially curved concavely.

6. A motor vehicle, comprising:
   a contactless charging device for arrangement on an underside of a motor vehicle, wherein the contactless charging device is configured such that energy is contactlessly transferable to the contactless charging device, the contactless charging device comprising:
   a first side facing away from the motor vehicle, and
   a second side opposite the first side, facing towards the motor vehicle, wherein the second side is configured to be ramp-shaped so that a thickness of the contactless charging device increases in a first direction, pointing towards a rear of the motor vehicle over a length of the contactless charging device in the first direction.

7. The motor vehicle as claimed in claim 6, wherein the contactless charging device is arranged on the underside of the motor vehicle such that the first side of the contactless charging device faces towards a ground underneath the motor vehicle and the first direction extends from the vehicle front to the rear of the motor vehicle.

8. The motor vehicle as claimed in claim 6, wherein the motor vehicle has a drive unit and a high-voltage battery, wherein the contactless charging device is arranged at least partially between the drive unit and the high-voltage battery, wherein the drive unit is arranged between the vehicle front and at least a part of the contactless charging device, and the high-voltage battery is arranged between the contactless charging device and the rear of the motor vehicle.

9. The motor vehicle as claimed in claim 8, wherein the motor vehicle is configured such that, upon the drive unit moving in the first direction due to an accident and the drive unit striking the contactless charging device, the movement of the drive unit is partially redirected into the second direction, and the drive unit strikes a part of a body frame of the motor vehicle, and not the high-voltage battery.

10. The motor vehicle as claimed in claim 8, wherein the contactless charging device and the high-voltage battery are secured such that the contactless charging device and the high-voltage battery partially move against the second direction during the spatial deflection of the drive unit moving in the first direction.

* * * * *